United States Patent [19]

Kokufukata et al.

[11] Patent Number: 4,494,145

[45] Date of Patent: Jan. 15, 1985

[54] TEMPERATURE COMPENSATION CIRCUIT IN A PICKUP TUBE DEVICE

[75] Inventors: Seigo Kokufukata; Tetsuya Sekido, both of Tokyo, Japan

[73] Assignee: Victor Company of Japan, Ltd., Japan

[21] Appl. No.: 416,645

[22] Filed: Sep. 10, 1982

[30] Foreign Application Priority Data

Sep. 16, 1981 [JP] Japan ............................. 56-145786

[51] Int. Cl.³ .............................................. H04N 5/14
[52] U.S. Cl. ..................................... 358/163; 358/166
[58] Field of Search ............... 358/160, 163, 55, 219, 358/161, 166; 354/62, 31, 59

[56] References Cited

U.S. PATENT DOCUMENTS 4,109,279  8/1978  Hirose et al. ........................ 358/55
4,301,472  11/1981  Danos .................................. 358/163

FOREIGN PATENT DOCUMENTS 2408918  9/1975  Fed. Rep. of Germany .
2010685  3/1980  Fed. Rep. of Germany .
2186793  1/1974  France .

Primary Examiner—Tommy P. Chin
Assistant Examiner—Michael D. Parker
Attorney, Agent, or Firm—Andrus, Sceales, Starke & Sawall

[57] ABSTRACT

A temperature compensation circuit in a pickup tube device comprising a pickup tube, a bias lighting device provided at the front surface of the pickup tube for irradiating a bias light, a circuit for generating a shading compensation signal, and a circuit for supplying a black gate pulse, comprises a temperature compensation signal generating circuit for generating a temperature compensation signal for cancelling variation in a signal current component from the pickup tube due to variation in the bias light obtained from the bias lighting device which is in accordance with temperature variation, a compensation signal obtaining circuit for obtaining a compensation signal by multiplexing the temperature compensation signal generated by the temperature compensation signal generating circuit with the shading compensation signal, and a mixing circuit for mixing the multiplexed compensation signal, the output signal of the pickup tube, and the black gate pulse.

6 Claims, 12 Drawing Figures

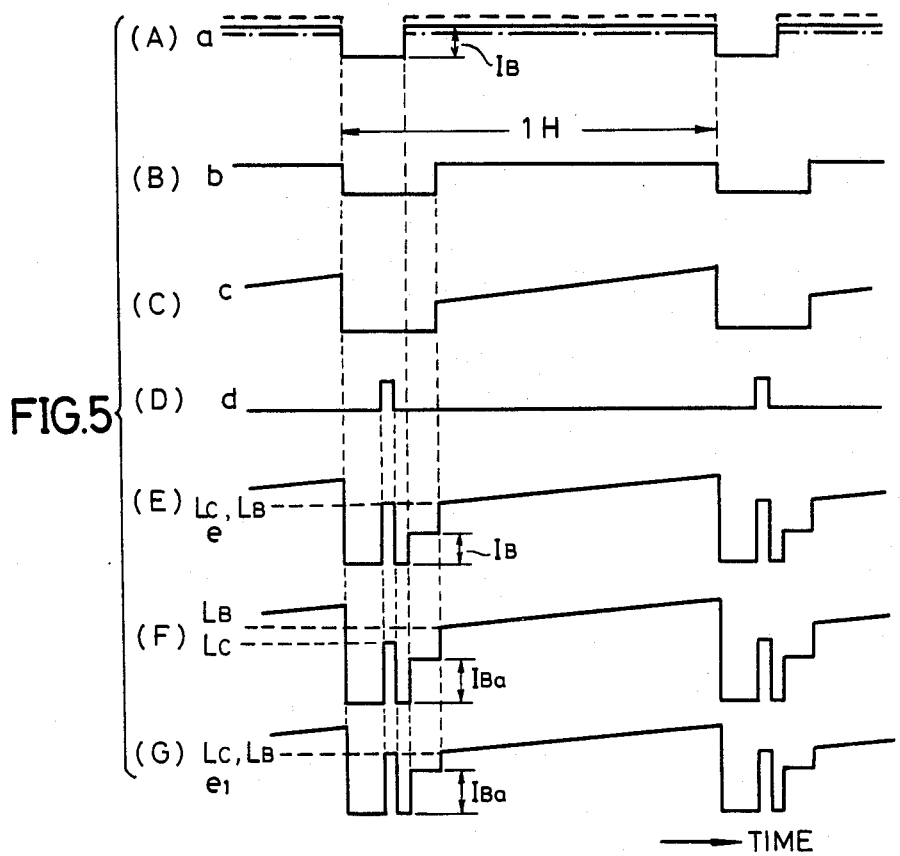
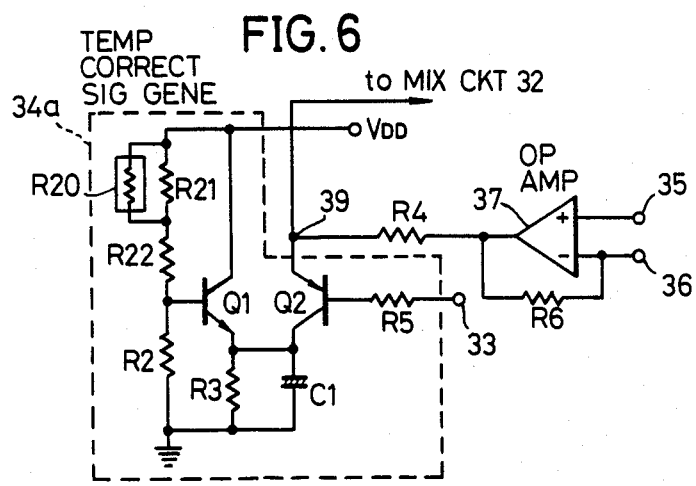

TEMPERATURE COMPENSATION CIRCUIT IN A PICKUP TUBE DEVICE

BACKGROUND OF THE INVENTION

The present invention generally relates to temperature compensation circuits in pickup tube devices, and more particularly to a temperature compensation circuit in a pickup tube device comprising a bias lighting device, capable of compensating a bias signal current variation due to temperature variation in the bias lighting device.

Generally, a photoconductive pickup tube of the blocking type having characteristics such as high sensitivity, low visual persistence (residual image), compact, and high resolution, is widely used as a pickup tube for a color television camera. However, in this type of a pickup tube, a capacitive residual image is introduced due to the electrostatic capacitance between a transparent conductive membrane and a photoconductive membrane. This electrostatic capacitance is introduced because the electrical charge of the electrostatic capacitance cannot be discharged with respect to the rapid change of the image. Accordingly, in order to reduce the residual image, a bias lighting device is provided at the front surface of the pickup tube, and a bias light is irradiated on the bias lighting device. The time constant is decreased by maintaining the device biased in the operating range.

The above bias lighting device generally has a construction wherein a plurality of light-emitting diodes are held at equally spaced intervals on a ring-shaped holding frame. However, because the light-emitting diodes are semiconductors, the light emitting characteristic varies according to the ambient temperature variation. For example, if the ambient temperature rises, the light emitting quantity of the bias light increases. Hence, the input light at the front surface of the pickup tube increases even when the luminous intensity of the image does not increase. As a result, the picture becomes bright and the color phase changes to produce an irregular color in the picture, by the pickup output thus obtained.

Particularly, in a color television camera system, a gamma compensation circuit is generally used to achieve correct reproduction of the luminance. However, as is well known, the gamma compensation characteristic of the gamma compensation circuit is a level compression characteristic, and the amplification at low levels of the video signal is exceedingly high. Accordingly, when the input light is low, the output light will vary greatly even when the variation in the input light is slight. Thus, the bias light must be compensated so that the bias light does not vary with the temperature variation, or electrically compensate the variation in the bias light caused by temperature variation in a signal system.

As a conventional circuit for carrying out compensation in accordance with the temperature variation (hereinafter referred to as temperature compensation), there was a temperature compensation circuit in which the light emitting quantity of the bias light is detected and compensation is carried out so that the bias light is always constant with respect to the variation in the bias light due to temperature variation in order to maintain the bias signal current of the bias lighting device constant. However, because this conventional temperature compensation circuit uses a constant current source, a large number of circuit elements are required. In addition, the cost of the temperature compensation circuit becomes high, since a high power source voltage is required. Hence, there was a disadvantage in that the above conventional temperature compensation circuit was unsuited for application in a portable type single-tube color television camera wherein there is a demand for low cost production.

SUMMARY OF THE INVENTION

Accordingly, it is a general object of the present invention to provide a novel and useful temperature compensation circuit in a pickup tube device, in which the above described disadvantages have been overcome.

Another and more specific object of the present invention is to provide a temperature compensation circuit in a pickup tube device, in which a compensation signal for cancelling the variation in a bias light due to temperature variation, is multiplexed with a shading compensation signal at a period wherein a black gate pulse is multiplexed to the shading compensation signal and in the vicinity of this period. According to the circuit of the present invention, it is possible to substantially cancel and compensate the variation in the characteristic of the bias light due to temperature variation, by use of a simple circuit.

Still another object of the present invention is to provide a temperature compensation circuit in a pickup tube device in which a compensation signal obtained by use of an element which undergoes the same variation as the variation in the characteristic of a bias lighting element due to temperature variation, is multiplexed with a shading compensation signal so that the clamp level and the black level become equal.

Other objects and further features of the present invention will be apparent from the following detailed description when read in conjunction with the accompanying drawings.

BRIEF DESCRIPTION OF THE DRAWINGS

FIGS. 5(A) through 5(G) are graphs respectively showing signal waveforms at each part of the block systems shown in FIGS. 3 and 4; and FIG. 6 is a circuit diagram showing a modification of an essential part of the circuit shown in FIG. 4.

DETAILED DESCRIPTION

Figure 1:
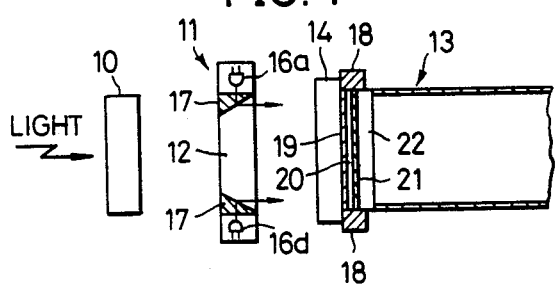
FIG. 1 is a side view in vertical cross section, showing a part of a pickup tube and a bias lighting device in a pickup tube device which may be applied with a temperature compensation circuit according to the present invention.
Figure 2:
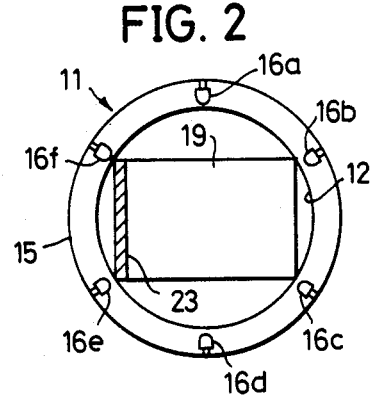
FIG. 2 is a front view showing a bias lighting device.

In FIG. 1, a light from an image passes through a lens 10, an opening 12 of a bias lighting device 11, and incides to a face plate 14 of a blocking type photoconductive pickup tube 13. As shown in FIG. 2, the bias lighting device 11 comprises a plurality of light-emitting diodes 16a through 16f arranged in an equally spaced interval on a ring-shaped holding frame 15, with the light emitting side facing the center of the holding frame 15. A diffusion lens 17 made of transparent acrylic resin is provided at the inner periphery of the light-emitting diodes 16a through 16f. Light from the light-emitting diodes 16a through 16f are diffused at the diffusion lens 17, and irradiated against the face plate of the pickup tube 13 as a bias light. For example, the bias lighting device 11 is arranged at a position with a gap of one milimeter from the face plate 14.

A stripe filter 19 held by a target ring 18, and a thin glass plate 20 having a thickness in the order of 15 to 20 micro-meters adhered to the stripe filter 19, are provided in the pickup tube 13. A transparent conductive membrane 21, and a photoconductive membrane 22 are successively laminated on the glass plate 20. A black mask part (optically black part) 23 is provided in the stripe filter 19.

Figure 3:
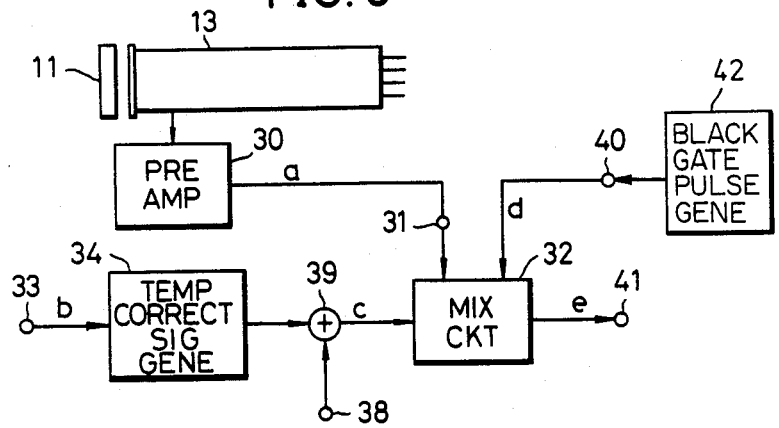
FIG. 3 is a general systematic block diagram showing a pickup tube device applied with a temperature compensation circuit according to the present invention.

A color information of the image is space-modulated into two primary colors red and blue, at the pickup tube 13. Accordingly, a frequency-division multiplexed signal comprising a modulated wave containing color information and a non-modulated wave containing luminance information obtained by converting the space-modulated image into an electrical signal, for example, is obtained. The above output signal of the pickup tube 13 is supplied to a preamplifier 30 shown in FIG. 3. An output signal a shown in FIG. 5(A) of the preamplifier 30, is supplied to a mixing circuit 32 shown in FIGS. 3 and 4, through a terminal 31. In the signal a shown in FIG. 5(A), the indication of the video information signal component is omitted, and only a signal current component $I_B$ due to the bias light is shown. The intensity of the bias light varies according to the ambient temperature variation with respect to the light-emitting diodes 16a through 16f. Hence, if the temperature rises, for example, the light quantity of the bias light increases, and the signal current increases as shown by broken lines in FIG. 5(A). On the other hand, if the temperature falls, the light quantity of the bias light decreases, and the signal current decreases as shown by a one-dot chain line in FIG. 5(A).

A horizontal driving signal b shown in FIG. 5(B) having a period of one horizontal scanning period (1 H), is supplied to a temperature compensation signal generating circuit 34 from an input terminal 33. In the temperature compensation signal generating circuit 34, an NPN transistor Q1 is base-biased by resistors R1 and R2, and the emitter of this transistor Q1 is connected to an input terminal of a power source voltage $V_{ss}$ through a parallel circuit comprising a resistor R3 and a capacitor C1. The collector of a switching PNP transistor Q2 is connected to the emitter of the transistor Q1, and the base of the transistor Q2 is connected to the input terminal 33 through a parallel circuit comprising a resistor R5 and a speed-up capacitor C2. The output is obtained from the emitter of the transistor Q2.

A constant voltage obtained by voltage-dividing the power source voltage $V_{DD}$ by the resistors R1 and R2, is constantly applied to the base of the above transistor Q1 which is connected as an emitter-follower. Thus, a constant voltage is obtained at the emitter of the transistor Q1 and applied to the collector of the transistor Q2 when there is no temperature variation. A transistor having a base-emitter temperature coefficient substantially equal to the temperature coefficient of the light-emitting diodes 16a through 16f within the bias lighting device 11, is used for the transistor Q1. Accordingly, the emitter output voltage of the transistor Q1 varies in accordance with the variation in the light generating quantity of the bias lighting device due to temperature variation.

The transistor Q2 is turned ON for a predetermined period for every 1 H, by the horizontal driving pulse B supplied to the input terminal 33. During the above period in which the transistor Q2 in ON, the emitter output voltage of the above transistor Q1 is obtained from the emitter of the transistor Q2.

A bias signal is applied to a non-inverting input terminal of an operational amplifier 37 from a terminal 35. A sawtooth wave or a parabolic wave (or a multiplexed wave of these sawtooth and parabolic waves) of the horizontal scanning period, or a sawtooth wave or a parabolic wave (or a multiplexed wave of these sawtooth and parabolic waves) of the vertical scanning period, is applied to an inverting input terminal of the operational amplifier 37 from a terminal 36. A resistor R6 is connected between the input terminal 36 and an output side of the operational amplifier 37. The above connected elements constitute a known static shading compensation circuit, and an output shading compensation signal of the operational amplifier 37 is applied to an adding point 39 from a terminal 38. As is well known, the shading compensation signal is a signal for compensating the effects of the dark current shading in the pickup tube.

As described above, the transistor Q2 is turned ON for a predetermined period for every 1 H by the horizontal driving pulse b, and during the period in which the transistor Q2 is ON, a temperature compensation signal is produced from the emitter of the transistor Q1 and obtained at the adding point 39. Therefore, as shown in FIG. 5(C), a compensation signal c obtained by adding the shading compensation signal and the temperature compensation signal, is obtained from the adding point 39 and supplied to the mixing circuit 32.

The mixing circuit 32 comprises an NPN transistor Q3, base bias resistance R12 and R13 for the transistor Q3, a collector resistor R10 of the transistor Q3, an emitter resistance R11 for the transistor Q3, resistors R7 and R9 respectively connected between the emitter of the transistor Q3 and input terminals 40 and 31, and a resistor R8 connected between the emitter of the transistor Q3 and the adding point 39.

The pickup tube output signal a shown in FIG. 5(A) is applied to the input terminal 31 from the preamplifier 30. A black gate pulse d shown in FIG. 5(D) for detecting the optically black part of the pickup tube output signal when the black mask part 23 of the stripe filter 19 is generated in a black gate pulse generating circuit 42 and is scanned, is applied to the input terminal 40. The structure of the black gate pulse generating circuit is known to one skilled in the art. The signals from the terminals 31 and 40 are respectively supplied to the emitter of the transistor Q3, through the resistors R9 and R7. In addition, the compensation signal c from the adding point 39 is also supplied to the emitter of the transistor Q3 through the resistor R8. Accordingly, a mixed signal e in which each of the above signals a, c, and d are respectively multiplexed, is obtained through an output terminal 41 from the collector of the transistor Q3, and supplied to a pre-processing circuit (not shown) provided at a succeeding stage. The component of the output signal a of the preamplifier 30, is clamped at the position of the black gate pulse d and determined of the black level, at the above pre-processing circuit.

If the ambient temperature is equal to room temperature, the above mixed signal has a waveform e as shown in FIG. 5(E), and the clamp level $L_c$ and the black level $L_B$ coincide. Hence, a normal state is obtained wherein the black is balanced.

Next, if the ambient temperature rises, the light intensity of the bias light incided from the bias lighting device 11 increases, and the bias signal current component within the output signal of the preamplifier 30 assumes a signal current component $I_{Ba}$ having a level higher than that of the signal current component $I_B$ shown in FIG. 5(A). However, the levels of the black gate pulse d and the static shading compensation signal within the blanking period remain substantially constant because there is almost no temperature dependency. Accordingly, in the conventional circuit which is not provided with the temperature compensation signal generating circuit 34, the black level $L_B$ became higher than the clamp level $L_c$ as shown in FIG. 5(F) in the mixed signal of the output signal a of the preamplifier 30, the static shading compensation signal, and the black gate pulse d. This resulted in the loss of balance of the black.

On the other hand, according to the present embodiment of the invention, the forward drop voltage at the base-emitter junction diode of the transistor Q3 within the temperature compensation signal generating circuit 34 decreases by the temperature rise, and the emitter output voltage of the transistor Q1 increases due to the above temperature rise. Hence, the temperature compensation voltage produced during the period in which the transistor Q2 is ON becomes high compared to the temperature compensation voltage obtained at room temperature. Thus, the peak value of the signal waveform c shown in FIG. 5(C) becomes smaller than that upon room temperature. As a result, the black level $L_B$ and the clamp level $L_c$ respectively coincide and the black becomes balanced in an output mixed signal e1 of the mixing circuit 32, as shown in FIG. 5(G). Therefore, the variation in the bias signal current due to temperature variation can be compensated. As described above, the deviation between the black level $L_B$ and the clamp level $L_c$ due to variation in the bias signal current can be compensated by varying the level of the temperature compensation signal produced from the emitter of the transistor Q2 in a reverse direction with respect to the variation in the intensity of the bias light with respect to the temperature variation, in order to cancel these variations. The compensation quantity can be set arbitrarily by the ratio of resistances of the resistors R8 and R9. In the mixed signal waveform e1 shown in FIG. 5(G), the signal current component $I_{Ba}$ indicates the increased bias signal current component within the output signal of the preamplifier 30 when the temperature rises.

Figure 4:
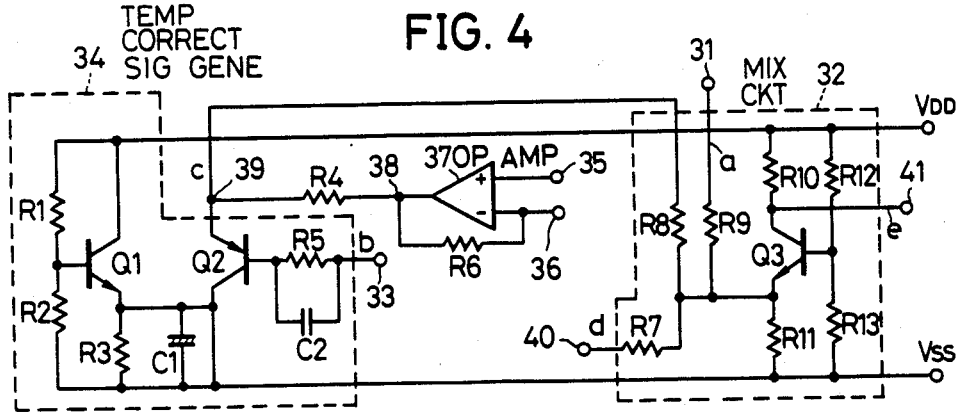
FIG. 4 is a circuit diagram showing an embodiment of a concrete circuit of an essential part of the block system shown in FIG. 3.

As described above, in the circuit according to the present invention, the bias signal current component is not maintained constant regardless of the temperature variation, but the temperature compensation signal waveform is multiplexed with the static shading compensation signal so that the black level and the clamp level in the mixed signal waveform supplied to the preprocessing circuit respectively coincide regardless of the the temperature variation. Accordingly, the circuit construction of the temperature compensation circuit can be simplified as shown in FIG. 4 wherein the circuit operates at a low power source voltage.

If the ambient temperature falls below room temperature, the light intensity of the bias light decreases, which is in a reverse relationship with respect to the case where the ambient temperature is above room temperature. Hence, the bias signal current component within the output signal of the preamplifier 30 becomes smaller than the signal current component $I_B$ (10 mA, for example) shown in FIG. 5(A), and the clamp level becomes higher than the black level in the conventional circuit. However, in the circuit according to the present invention, the level of the temperature compensation signal from the temperature compensation signal generating circuit 34 decreases, to increase the peak value of the output signal waveform c at the adding point 39. As a result, the clamp level and the black level coincides. Therefore, even if there is temperature variation, the black can be balanced automatically, and it becomes possible to prevent bad effects from being introduced in the video output of the television camera due to the temperature variation.

Next, a modification of the temperature compensation signal generating circuit 34 is shown in FIG. 6, as a temperature compensation signal generating circuit 34a. In FIG. 6, those parts which are the same as those corresponding parts in FIG. 4 are designated by the same reference numerals, and their description will be omitted. In the temperature compensation signal generating circuit 34a, a thermistor R20 and a resistor R21 connected in parallel and a resistor R22 connected in series thereto, is used instead of the resistor R1 in the temperature compensation signal generating circuit 34. According to the present modification, the base bias voltage of the transistor Q1 is varied according to the temperature variation, because the above thermistor R20 is used.

Examples of numerical values of the circuit elements in the above temperature compensation signal generating circuit 34a are listed below.

Resistors: R2=2.7 kΩ, R3=2.7 kΩ, R5=10 kΩ, R20=10 kΩ, R21=1.2 kΩ, R22=2.4 kΩ.

Further, the present invention is not limited to these embodiments, but various variations and modifications may be made without departing from the scope of the present invention.

What is claimed is:

1. A temperature compensation circuit in a pickup tube device comprising a pickup tube, a bias lighting device provided at the front surface of said pickup tube for irradiating a bias light, a circuit for generating a shading compensation signal, and a circuit for supplying a black gate pulse, said temperature compensation circuit comprising:

a temperature compensation signal generating circuit for generating a temperature compensation signal for cancelling variation in a signal current component from said pickup tube due to variation in the bias light obtained from said bias lighting device which is in accordance with temperature variation;

means for obtaining a multiplexed compensation signal by multiplexing the temperature compensation signal generated by said temperature compensation signal generating circuit with said shading compensation signal; and a mixing circuit for mixing said multiplexed compensation signal, an output signal of said pickup tube, and said black gate pulse.

2. A temperature compensation circuit as claimed in claim 1 in which said bias lighting device comprises light-emitting diodes for irradiating the bias light, and said temperature compensation signal generating circuit comprises a temperature compensation element having a characteristic which varies with the temperature variation in accordance with the variation in the characteristic of said light-emitting diodes due to the temperature variation.

3. A temperature compensation circuit as claimed in claim 2 in which said temperature compensation element comprises a transistor having a diode characteristic equal to the temperature characteristic of said light-emitting diodes.

4. A temperature compensation circuit as claimed in claim 2 in which said temperature compensation element comprises a transistor and a thermistor connected to said transistor so that the base-bias voltage of said transistor varies according to the temperature variation.

5. A temperature compensation circuit as claimed in claim 1 in which said temperature compensation signal generating circuit comprises a first transistor for generating said temperature compensation signal, and a second transistor applied with a horizontal driving pulse having a period of one horizontal scanning period, for obtaining said temperature compensation signal for a predetermined period for every one horizontal scanning period.

6. A temperature compensation circuit as claimed in claim 5 in which the period in which said temperature compensation signal is obtained from said second transistor is a period in which said black gate pulse is mixed in said mixing circuit and a period in the vicinity thereof.

* * * * *